United States Patent
Nam et al.

(10) Patent No.: US 8,543,132 B2
(45) Date of Patent: Sep. 24, 2013

(54) METHOD OF ESTIMATING POSITION OF MOBILE NODE IN WIRELESS SENSOR NETWORK

(75) Inventors: Yoon Seok Nam, Seoul (KR); Jae Doo Huh, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 399 days.

(21) Appl. No.: 12/866,917

(22) PCT Filed: Oct. 10, 2008

(86) PCT No.: PCT/KR2008/005978
§ 371 (c)(1),
(2), (4) Date: Aug. 10, 2010

(87) PCT Pub. No.: WO2009/110669
PCT Pub. Date: Sep. 11, 2009

(65) Prior Publication Data
US 2011/0007650 A1    Jan. 13, 2011

(30) Foreign Application Priority Data
Mar. 7, 2008 (KR) .................. 10-2008-0021539

(51) Int. Cl.
*H04W 24/00* (2009.01)
(52) U.S. Cl.
USPC .............. 455/456.1; 455/456.2; 455/404.2
(58) Field of Classification Search
USPC ................... 455/404.2, 456.1, 456.2
See application file for complete search history.

(56) References Cited

U.S. PATENT DOCUMENTS

| | | | |
|---|---|---|---|
| 7,289,466 B2 | 10/2007 | Kore et al. | |
| 8,106,828 B1* | 1/2012 | Do et al. ................. | 342/463 |
| 2002/0122003 A1 | 9/2002 | Patwari et al. | |
| 2004/0072582 A1* | 4/2004 | Aljadeff et al. ............ | 455/456.1 |
| 2005/0037775 A1* | 2/2005 | Moeglein et al. .......... | 455/456.1 |
| 2005/0049821 A1 | 3/2005 | Sahinoglu | |
| 2006/0025154 A1 | 2/2006 | Alapuranen et al. | |
| 2006/0083340 A1* | 4/2006 | Gezici et al. ................. | 375/358 |

(Continued)

FOREIGN PATENT DOCUMENTS

KR    100701351 B1    3/2007

OTHER PUBLICATIONS

Andy Harter et al. "The Anatomy of a Context-Aware Application", In Wireless Networks, Feb. 2002, pp. 187-197, vol. 8.

(Continued)

*Primary Examiner* — Kwasi Karikari

(57) ABSTRACT

The present invention relates to a method of estimating the position of a mobile node in a wireless sensor network using a passive mode OWR method. The method includes: estimating frequency offsets of anchor nodes and a mobile node; allowing the anchor nodes to sequentially transmit ranging frames; allowing the mobile node to receive the ranging frames and to estimate the difference between the reception times of signals from two anchor nodes; and applying the estimated difference between the reception times of the signals to time difference of arrival (TDOA) to estimate the position of the mobile node. According to the above-mentioned structure of the present invention, a plurality of mobile nodes can estimate their positions with a minimum number of ranging frame transmissions, without using a separate network synchronization unit. In addition, it is possible to easily construct a wireless sensor network for position recognition, and rapidly and accurately perform distance estimate using an OWR method.

12 Claims, 4 Drawing Sheets

(56) References Cited

U.S. PATENT DOCUMENTS

2007/0040739 A1    2/2007    Small
2007/0179782 A1    8/2007    Chung et al.
2007/0200759 A1*   8/2007    Heidari-Bateni et al. .... 342/387

OTHER PUBLICATIONS

Nissanka Bodhi Priyantha, "The Cricket Indoor Location System", Jun. 2005, Massachusetts Institute of Technology.

Yi Jiang et al., "An Asymmetric Double Sided Two-Way Ranging for Crystal Offset", ISSSE, Jul. 2007, pp. 525-528, IEEE.

Bin Zhen et al., "Clock Offset Compensation in Ultra-Wideband Ranging", IEICE Trans. Fundamentals, Nov. 2006, pp. 3082-3088, vol. 89-A, No. 11, The Institute of Electronics, Information and Communication Engineers.

Mahmoud Tavakoli Shiraji et al., "Human Tracking Devices: the Active Badge/Bat and Digital Angel/Verichip systems", ECE 399 Project Paper #1.

Nissanka B. Priyantha et al., "The Cricket Location-Support System", 6$^{th}$ ACM International Conference on Mobile Computing and Networking (ACM MOBICOM), Aug. 2000, ACM, Boston, MA.

Adam Smith et al., "Tracking Moving Devices with the Cricket Location System", Proceedings of the 2$^{nd}$ International Conference on Mobile System, Applications, and Services, Jun. 2004, pp. 190-192, ACM.

"IEEE Standard for Information Technology—Telecommunications and Information Exchange Between Systems—Local and Metropolitan Area Networks—Specific Requirements, Part 15.4: Wireless Medium Access Control (MAC) and Physical Layer (PHY) Specifications for Low-Rate Wireless Personal Area Networks (LR-WPANs): Amendment 1: Add alternate PHYs", IEEE Std 802.14.4a-2007 (Amendment to IEEE Std 802.15.4-2006), 2007, IEEE Computer Society.

"Ubisense Compact Tag", http://www.ubisense.net, 2007.

"System Overview", http://www.ubisense.net, 2007.

"Ubisense Slim Tag", http://www.ubisense.net, 2007.

Yoon-Seok Nam et al., "Wirelessly Synchronized One-Way Ranging Algorithm with Active Mobile Nodes", ETRI Journal, Aug. 2009, vol. 31, No. 4, ETRI.

International Search Report for PCT/KR2008/005978 filed Oct. 10, 2008.

Written Opinion of the International Searching Authority for PCT/KR2008/005978 filed Oct. 10, 2008.

* cited by examiner

METHOD OF ESTIMATING POSITION OF MOBILE NODE IN WIRELESS SENSOR NETWORK

TECHNICAL FIELD

The present invention relates to a method of estimating the position of a mobile node in a wireless sensor network. More particularly, the present invention relates to a method of estimating the position of a mobile node in a wireless sensor network using a passive mode unidirectional distance estimating method.

The present invention was supported by the IT R&D program of MIC/IITA [2007-S-047-01, Development of HD Class Multimedia System Technology over Wireless Home Network].

BACKGROUND ART

In general, a wireless sensor network uses a small number of anchor nodes to estimate the positions of a plurality of mobile nodes, and is utilized for various applications, such as an application for locating a mobile node and an application for providing services suitable for the conditions of the mobile node.

Particularly, a position estimating algorithm uses the angle and distance between an anchor node and a mobile node, and the intensity of received signals. The distance is generally used, and is estimated from time of flight (TOF) that is estimated by ultrasonic waves or radio signals. In this case, synchronization between the anchor node and the mobile node is needed in order to obtain accurate distance information or TOF.

When a wide-area wireless network service such as a mobile phone service is provided, the supply of a network synchronization clock is very important to stabilize the operation of wide-area systems. The network synchronization clock is commonly supplied to various anchor nodes by wires.

On the other hand, in a temporary or local area network, such as a sensor network or an Ad hoc network, it is uneconomical to provide a separate network synchronization unit, or it is complicated or difficult to install the network synchronization unit.

Meanwhile, in the wireless sensor network according to the related art, in order to estimate the position of a mobile node, an active bat system and a cricket system use radio signals and ultrasonic signals. In this case, radio signals with a high propagation speed (about $3 \times 10^8$ m/s) are used for synchronization, and ultrasonic signals with a low propagation speed (about 340 m/s) are used to calculate TOF. According to the related art, a separate wire network synchronization signal is supplied from a control server that calculates position to anchor nodes through a wire cable with a predetermined length.

In the related art, there are a TWR (two-way ranging) method and a symmetric double sided (SDS)-TWR method that are capable of asynchronously calculating TOF without a synchronization clock, but a one-way ranging (OWR) method supported by network synchronization is strongly recommended with the merit of simple procedure. Further, the related art includes an active mode in which a mobile node transmits a ranging frame and a network estimates the position of the mobile node, and a passive mode in which anchor nodes transmit ranging frames and a mobile node estimates its position.

However, in the TWR and SDS-TWR methods according to the related art, estimate errors occur due to frequency offset between the nodes, three or four frame trans-missions are needed between one mobile node and each anchor node, and the number of frames to be transmitted increases. As a result, a long time is required for one position estimate, which causes various problems in providing services to a plurality of mobile nodes. For this reason, the OWR method that is effective after network synchronization has been proposed in the related art. However, the network synchronization and the OWR method are left on implementation dependent.

DISCLOSURE OF INVENTION

Technical Problem

The present invention has been made in an effort to provide a method of estimating the position of a mobile node in a wireless sensor network using a passive mode OWR method.

Technical Solution

In order to achieve the object, according to the invention, there is provided a method of estimating the position of a mobile node in a wireless sensor network that is capable of estimating the reception time of signals in the wireless sensor network, estimating the difference between the arrival times of the received signals to a pair of nodes, and estimating the position of the mobile node. According to the invention, a wireless sensor network estimates the frequency offsets of the anchor nodes and the mobile node, the anchor nodes sequentially transmit ranging frames, and the mobile node receives the ranging frames to estimate the difference between the times when the mobile node receives the signals transmitted from two anchor nodes, unlike the related art that uses a separate synchronization method of supplying a network synchronization clock through a wire cable or asynchronously estimates time of flight (TOF) according to the two-way ranging (TWR) method and the symmetric double sided (SDS)-TWR method. In this case, the estimated difference between the reception times is directly applied to a time difference of arrival (TDOA) algorithm to estimate the position of the mobile node.

According to an aspect of the present invention, there is provided a method of estimating the position of a mobile node in a wireless sensor network. The method includes: estimating frequency offsets of anchor nodes and a mobile nodes; allowing the anchor nodes to sequentially transmit ranging frames; allowing the mobile node to receive the ranging frames and to estimate the difference between the reception times of ranging frames from two anchor nodes; and applying the estimated difference between the reception times of the ranging frames to TDOA to estimate the position of the mobile node.

According to another aspect of the present invention, there is provided a method of estimating the positions of a plurality of mobile nodes in a wireless sensor network including a small number of anchor nodes. The method includes: estimating clock frequency offsets of the anchor nodes; when a new mobile node is connected, estimating the frequency offset of the mobile node; allowing the anchor nodes to sequentially transmit ranging frames; allowing the mobile node to receive the ranging frames, form node pairs, and estimate a difference in distance between the formed node pair; and applying the difference in distance between the node pair to TDOA to estimate the position of the mobile node.

In the estimating of the difference in distance between the node pair, the mobile node may induce instantaneous synchronization between the node pair using the positions of the anchor nodes, the frequency offsets of the related nodes, and a measured counter value, and estimate the difference in distance between the node pair.

According to still another aspect of the present invention, there is provided a method of estimating the position of a mobile node in a wireless sensor network including a plurality of anchor nodes. The method includes: using the anchor nodes to form pairs of anchor nodes connected to each other; calculating frequency offsets of the anchor nodes on the basis of information on the transmission and reception times of ranging frames between the pair of anchor nodes; calculating the frequency offset of the mobile node on the basis of information on the transmission and reception times of ranging frames between one of the anchor nodes whose frequency tolerance has been known and a new mobile node; allowing the anchor nodes to sequentially transmit the ranging frames, starting from a reference anchor node, and allowing the other anchor nodes and the mobile node to receive the transmitted ranging frames; allowing the mobile node to calculate a difference in distance between the anchor nodes and the mobile node at a synchronization time on the basis of information on the reception time of the ranging frame, time information included in the ranging frame, the positions of the anchor nodes, and the frequency offset of each node; and applying the calculated difference in distance to TDOA to estimate the position of the mobile node.

In the calculation of the frequency offsets of the anchor nodes, the frequency offsets of two nodes may be calculated from the distance between the two nodes, an expression to calculate TOF between the two nodes, and an expression obtained from the relationship in which the transmission and reception times of the ranging frame, which are generated in parallel between the two nodes, are equal to each other.

In the calculation of the frequency offset of the mobile node, when one anchor node whose frequency offset has been known is used to calculate the frequency offset of a new mobile node, the frequency offset of each of the two nodes may be calculated from an expression obtained from the relationship in which the transmission and reception times of the ranging frame, which are generated in parallel between the two nodes, are equal to each other.

The receiving of the ranging frames by the other anchor nodes and the mobile node may include: allowing the reference anchor node to transmit the ranging frame and allowing the other anchor nodes receiving the ranging frame to insert time information related to the ranging frame into the ranging frame and transmit the ranging frame again; and allowing the mobile node to acquire information on the reception time of the ranging frames from all the anchor nodes and the information included in the ranging frames.

The receiving of the ranging frames by the other anchor nodes and the mobile node may further include inserting, into the ranging frame transmitted from the anchor node, information on the latest time when the previous anchor node receives the ranging frame.

The calculation of the difference in distance may include estimating the position of the mobile node whenever the mobile node receives the ranging frame from one of the anchor nodes.

The calculation of the difference in distance may include: using information on the time when the other anchor nodes and the mobile node receive the ranging frame transmitted from the reference anchor node as a standard for time synchronization; and using the time when the other anchor nodes transmit the ranging frame and the time when the mobile node receives the ranging frame to estimate the distance between the reference anchor node and the mobile node and the difference in distance between the other anchor nodes and the mobile node.

According to yet another aspect of the present invention, there is provided a method of estimating the position of a mobile node in a wireless sensor network including a location server, a plurality of anchor nodes, and the mobile node. The method includes: estimating differences between a reference frequency and the frequencies of the anchor nodes under the control of the location server and storing the estimated result in the location server; when a new mobile node is added to a ranging service, estimating differences between the reference frequency and the frequencies of a reference anchor node and the mobile node under the control of the location server, and storing the estimated result in the location server; allowing the location server to control the reference anchor node and the other anchor nodes to transmit frames including information required for ranging; allowing the mobile node to acquire distance difference information to be applied to TDOA from the information required for ranging, which is included in the transmitted frame and information on the reception time of the frame; and transmitting the frame including the acquired distance difference information to the location server to request to estimate the position of the mobile node.

Advantageous Effects

As described above, according to the above-mentioned aspects of the present invention, it is possible to estimate the positions of a plurality of mobile nodes with a minimum number of ranging frame transmissions without using a separate network synchronizing unit.

According to the above-mentioned aspects of the present invention, it is possible to easily construct a wireless sensor network for recognizing position without using a separate network synchronization unit such as a wire cable or a very precise and expensive local oscillator, and the mobile node can estimate its position. According to the above-mentioned aspects of the present invention, it is possible to rapidly and accurately perform ranging using an OWR method, and accurately estimate the position of a mobile node.

MODE FOR THE INVENTION

Figure 1:
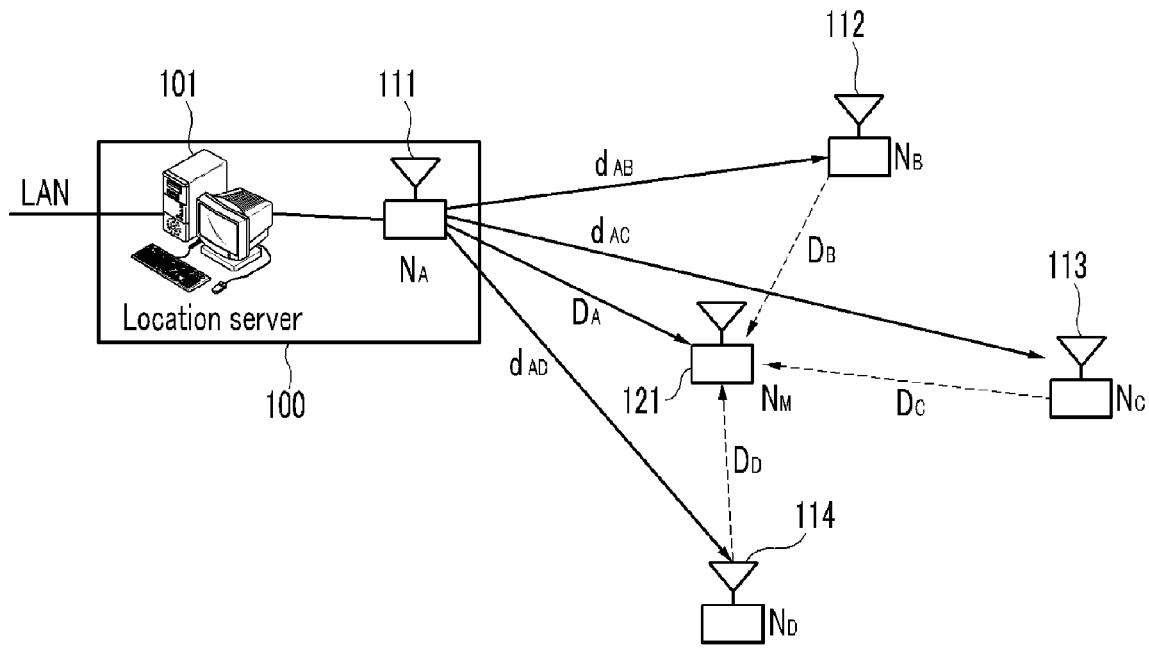
FIG. 1 is a diagram illustrating the structure of a wireless sensor network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms -er, -or, and module described in the specification mean units for processing at least one function and operation, and can be implemented by hardware components or software components, and combinations thereof.

A method of estimating the position of a mobile node in a wireless sensor network according to an exemplary embodiment of the present invention may estimate the position of the mobile node using time difference of arrival (TDOA) by estimating an exact signal arrival time using one-way ranging (OWR) and estimating the difference between the times when received signals arrive at a pair of nodes.

That is, in the method of estimating the position of a mobile node in a wireless sensor network according to the exemplary embodiment of the present invention, in the wireless sensor network in which a separate network synchronization unit, such as a wire cable, is not constructed, and clock frequency offset characteristics of a sensor node that is being operated are not previously checked, a mobile node position estimate system including a small number of anchor nodes and a plurality of mobile nodes estimates the frequency offset between the anchor nodes and the mobile nodes. When the anchor nodes sequentially transmit ranging frames, the mobile node induces instantaneous synchronization between a pair of nodes using the positions of the anchor nodes, the frequency offset of a related node, and a measured counter value, and estimates a difference between the distances of the pair of nodes. The estimated distance difference is applied to TDOA to estimate the position of the mobile node. In this way, it is possible to solve the problems of the related art.

Hereinafter, a method of estimating the position of a mobile node in a wireless sensor network according to an exemplary embodiment of the present invention will be described in detail with reference to the accompanying drawings.

FIG. 1 is a diagram illustrating a structure of estimating the position of a mobile node in a wireless sensor network according to an exemplary embodiment of the present invention.

As shown in FIG. 1, the wireless sensor network according to the exemplary embodiment of the present invention includes a location server 101, a plurality of anchor nodes $N_A$ (111), $N_B$ (112), $N_C$ (113), and $N_D$ (114), and a mobile node $N_M$ (121). The wireless sensor network according to the exemplary embodiment of the present invention is configured to estimate the position of a mobile node (i.e., the position of the mobile node 121) using frequency offsets of the nodes 111 to 114 and 121 and the difference among the signal arrival times thereof.

That is, as shown in FIG. 1, in the wireless sensor network according to the exemplary embodiment of the present invention, when the anchor nodes 111 to 114 transmit ranging frames, the mobile node 121 calculates its position on the basis of information on the transmission and reception times of the frame, or the mobile node transmits the information to the location server 101 to request to calculate the position of the mobile node 121.

In the wireless sensor network according to the exemplary embodiment of the present invention, the mobile node 121 may estimate its position, similar to GPS and cricket systems, or the network may estimate the position of the mobile node, similar to an active bat and a mobile phone. When the mobile node 121 calculates its position, it is possible to protect the positional information of the mobile node 121. When the network calculates the position of the mobile node, it is possible to significantly reduce the manufacturing costs of terminals, and the network can provide services most suitable for the conditions of the mobile node 121. Further, in the wireless sensor network according to the exemplary embodiment of the present invention, the mobile node 121 may transmit related information to the network and the network may estimate the position of the mobile node, if necessary.

It is possible to acquire information on the difference between the times when the mobile node 121 receives the frames transmitted from two of the anchor nodes 111 to 114 by pairing the nodes on the basis of the time when the mobile node 121 receives the frame transmitted from one of the plurality of anchor nodes 111 to 114 and synchronizing the node pair. In the following description, the nodes are paired as follows: the first anchor node $N_A$ (111)—the second anchor node $N_B$ (112)—the mobile node 121; the first anchor node $N_A$ (111)—the third anchor node $N_C$ (113)—the mobile node (121); and the first anchor node $N_A$ (111)—the fourth anchor node $N_D$ (114)—the mobile node 121.

The location server 101 has known the positions of the plurality of anchor nodes 111 to 114, estimates the frequency offsets between the anchor nodes 111 to 114 and the mobile node 121, controls the procedure performed between the anchor nodes 111 to 114 and the mobile node 121, and calculates the position of the mobile node 121 on the basis of information received from the mobile node 121 using an algorithm such as TDOA.

The location server 101 periodically or aperiodically controls the anchor nodes 111 to 114 to transmit ranging frames.

The location server 101 and the first anchor node $N_A$ (111) connected to the location server 101 form separate equipment 100. The separate equipment 100 performs a complicated operation using the location server 101, and serves as a gateway of the sensor network through, for example, a LAN.

The plurality of anchor nodes 111 to 114 transmits the ranging frames to the mobile node 121 under the control of the location server 101. In this case, as the dimension of position coordinates increases to three dimensions and a service range increases, a larger number of anchor nodes 111 to 114 are needed.

The mobile node 121 estimates its position on the basis of information on the transmission and reception times of the frames from the anchor nodes 111 to 114 and information on the frame reception time of the mobile node 121. When the mobile node 121 does not have the capability to perform a complicated operation, the mobile node 121 may transmit the collected information to the location server 101 through the first anchor node $N_A$ (111) connected to the location server 101 to request the location server to perform the complicated operation instead of the mobile node.

Next, a method of estimating the position of a mobile node in a wireless sensor network according to an exemplary embodiment of the present invention will be described in detail with reference to FIGS. 2 to 7.

Figure 2:
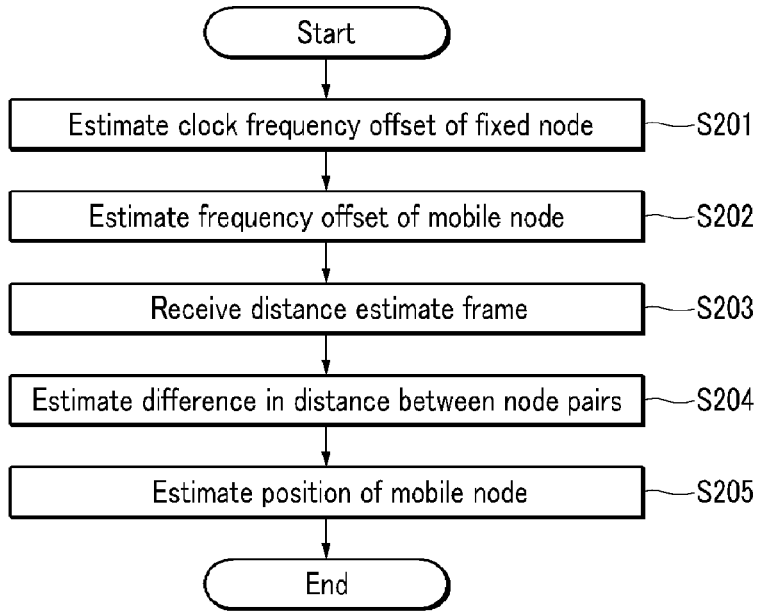
FIG. 2 is a flowchart illustrating a method of estimating the position of a mobile node in a wireless sensor network according to a first exemplary embodiment of the present invention.

FIG. 2 is a flowchart illustrating the method of estimating the position of a mobile node in a wireless sensor network according to the exemplary embodiment of the present invention.

When the wireless sensor network according to the exemplary embodiment of the present invention includes a small number of anchor nodes 111 to 114, in order to estimate the positions of a plurality of mobile nodes 121, the wireless sensor network estimates the clock frequency offsets of the anchor nodes 111 to 114 (S201). When a new mobile node 121 is connected, the wireless sensor network estimates the frequency offset of the mobile node 121 (S202).

In the wireless sensor network according to the exemplary embodiment of the present invention, when the anchor nodes 111 to 114 sequentially transmit ranging frames, the mobile node 121 receives the ranging frames transmitted from the anchor nodes 111 to 114 (S203). Then, the wireless sensor network pairs the nodes (e.g., the first anchor node $N_A$ (111)—the second anchor node $N_B$ (112)—the mobile node 121, the first anchor node $N_A$ (111)—the third anchor node $N_C$ (113)—the mobile node 121, and the first anchor node $N_A$ (111)—the fourth anchor node $N_D$ (114)—the mobile node 121), and estimates the difference in distance between the node pairs (S204).

Then, the wireless sensor network according to the exemplary embodiment of the present invention applies the difference in distance between the node pairs estimated in step S204 to time difference of arrival (TDOA), thereby estimating the position of the mobile node 121 (S205).

Figure 3:
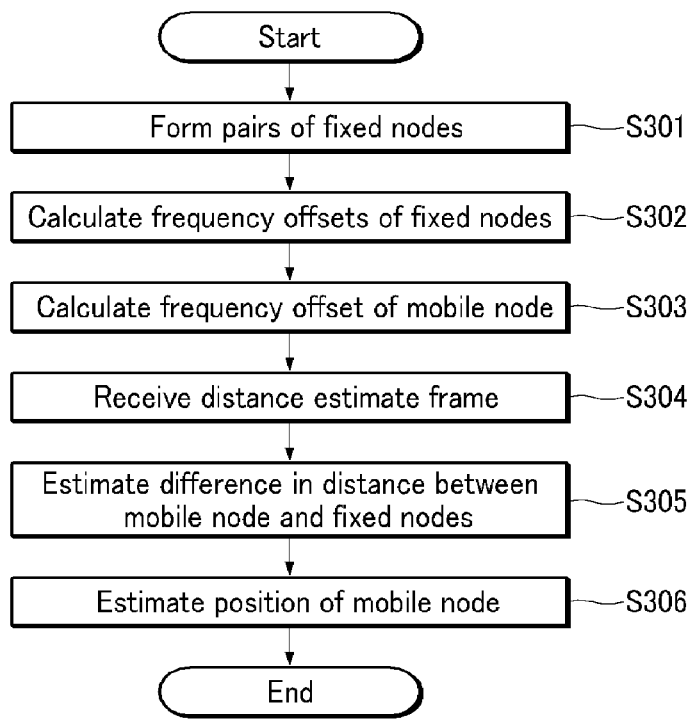
FIG. 3 is a flowchart illustrating a method of estimating the position of a mobile node in a wireless sensor network according to a second exemplary embodiment of the present invention.

FIG. 3 is a flowchart illustrating a method of estimating the position of a mobile node in a wireless sensor network according to a second embodiment of the present invention.

When the wireless sensor network according to this exemplary embodiment of the present invention includes a plurality of anchor nodes 111 to 114, in order to estimate the position of the mobile node 121, the wireless sensor network forms pairs of the anchor nodes 111 to 114 connected to each other (e.g., the first anchor node $N_A$ (111)—the second anchor node $N_B$ (112), the first anchor node $N_A$ (111)—the third anchor node $N_C$ (113), and the first anchor node $N_A$ (111)—the fourth anchor node $N_D$ (114)) (S301), and calculates the frequency offset between the anchor nodes 111 to 114 using information on the transmission and reception times of the ranging frames in the pairs of the anchor nodes (S302).

The wireless sensor network according to this exemplary embodiment of the present invention calculates the frequency offset of each of two nodes, using the distance between two nodes, an expression for calculating time of flight (TOF) between two nodes, and an expression obtained from the relationship in which the transmission and reception times of the ranging frames generated in parallel between the two nodes are equal to each other, in step S302. The wireless sensor network according to this exemplary embodiment of the present invention applies the frequency offset and the information on the transmission and reception times of the ranging frames to calculate the TOP between two nodes. Therefore, the wireless sensor network is insensible to the clock frequency offset of the node and can accurately estimate the distance.

The wireless sensor network according to this exemplary embodiment of the present invention uses information on the time when the ranging frame is transmitted and received between a new mobile node 121 and one anchor node 111, 112, 113, or 114 whose frequency tolerance has been known, among the anchor nodes 111 to 114 whose frequency offsets are calculated in step S302 to calculate the frequency offset of the mobile node 121 (S303).

In this case, in Step S303, the wireless sensor network according to this exemplary embodiment of the present invention calculates the frequency offset of the new mobile node 121 using one of the anchor nodes 111 to 114 whose frequency offset has been known, using the expression obtained from the relationship in which the transmission and reception times of the ranging frames generated in parallel between the two nodes are equal to each other.

In the wireless sensor network according to this exemplary embodiment of the present invention, when a reference anchor node (e.g., the first anchor node $N_A$ (111)) among the anchor nodes 111 to 114 transmits a ranging frame, the other anchor nodes 112 to 114 and a plurality of mobile nodes 121 receive the ranging frame transmitted from the reference anchor node (e.g., the first anchor node $N_A$ (111)) (S304).

In the wireless sensor network according to this exemplary embodiment of the present invention, in step S304, the other anchor nodes 112 to 114 receiving the ranging frame transmitted from the reference anchor node (e.g., the first anchor node $N_A$ (111)) transmit the ranging frame including time information related to the ranging frame. Therefore, all the mobile nodes 121 can acquire information on the reception times of the ranging frames from all the anchor nodes 111 to 114 and information included in the ranging frames.

The wireless sensor network according to this exemplary embodiment of the present invention calculates the difference in distance between the anchor nodes 111 to 114 and the mobile node 121 at the synchronized time, on the basis of information on the reception time of the ranging frame from each of the mobile nodes 121, the time information included in the ranging frame, the positions of the anchor nodes 111 to 114, and the frequency offset of each of the nodes 111 to 114 and 121 (305).

In step S305, the wireless sensor network according to this exemplary embodiment of the present invention estimates the difference between the distance between the reference anchor node 111 and the mobile node 121 and the distance between the other anchor nodes 112 to 114 and the mobile node 121, by using information on the time when the other anchor nodes 112 to 114 and the mobile node 121 receive the ranging frame transmitted from the reference anchor node (e.g., the first anchor node $N_A$ (111)) as a standard for time synchronization, and using the time when the other anchor nodes 112 to 114 transmit ranging frames and the time when the mobile node 121 receives the ranging frames.

In the wireless sensor network according to this exemplary embodiment of the present invention, since the ranging frame transmitted from each of the anchor nodes 111 to 114 includes information on the time when another anchor node 112, 113, or 114 receives the ranging frame lately in step S304, it is possible to estimate the position of the mobile node 121 in step S305 whenever the mobile node 121 receives the ranging frame transmitted from one of the anchor nodes 111 to 114.

The wireless sensor network according to this exemplary embodiment of the present invention applies the difference in distance between the anchor nodes 111 to 114 and the mobile node 121 calculated in step S305 to TDOA, thereby estimating the position of the mobile node 121 (S306).

Figure 4:
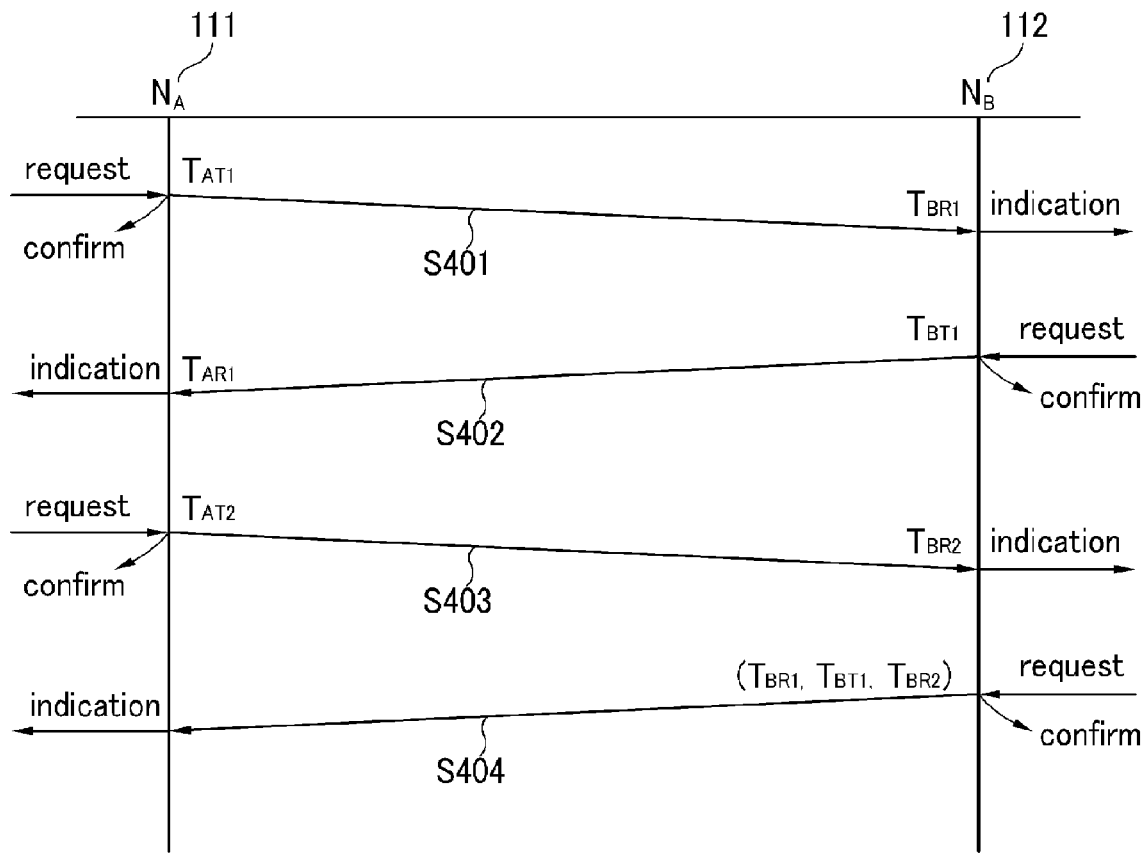
FIG. 4 is a flowchart illustrating a process of transmitting time information in the wireless sensor network according to the first exemplary embodiment of the present invention.

FIG. 4 is a flowchart illustrating a process of transmitting time information in a wireless sensor network according to an exemplary embodiment of the present invention. Specifically, FIG. 4 is a flowchart illustrating a process of transmitting time information to calculate a frequency offset.

FIG. 4 shows a process of estimating a frequency offset using SDS-TWR in the wireless sensor network according to the exemplary embodiment of the present invention. However, it will be understood that the process of estimating the frequency offset according to the present invention is not limited to SDS-TWR.

In order to provide frequency offset information that is capable of forming two simultaneous equations, as in steps S401 and S403 shown in FIG. 4, sufficient conditions are to transmit two parallel ranging frames and the ranging frame used to estimate TOF in a state in which the distance between the nodes has been known. SDS-TWR meets the sufficient conditions.

As shown in FIG. 4, in step S401, the first anchor node $N_A$ (111) transmits a ranging frame ($T_{AT1}$), and the second anchor node $N_B$ (112) receives the ranging frame ($T_{BR1}$). In step S402, the second anchor node $N_B$ (112) transmits a ranging frame ($T_{BT1}$), and the first anchor node $N_A$ (111) receives the ranging frame ($T_{AR1}$). In step S403, the first anchor node $N_A$ (111) transmits a ranging frame ($T_{AT2}$), and the second anchor node $N_B$ (112) receives the ranging frame ($T_{BR2}$). In step S404, the second anchor node $N_B$ (112) transmits time information generated until now to the first anchor node $N_A$ (111) ($T_{BR1}$, $T_{BT1}$, and $T_{BR2}$), and the first anchor node $N_A$ (111) receives the time information.

That is, in step S404, the first anchor node $N_A$ (111) collects information generated during the transmission of the ranging frames in steps S401, S402, and S403, and estimates the difference between a reference frequency and the frequencies of the first anchor node $N_A$ (111) and the second anchor node $N_B$ (112).

Referring to FIG. 4, a description will be given of an algorithm for calculating a frequency offset for local clocks of the second anchor node $N_B$ (112) and the first anchor node $N_A$ (111) from a set of the second anchor node $N_B$ (112), the first anchor node $N_A$ (111), and the location server 101 that transmit the ranging frames including time information in the wireless sensor network according to this exemplary embodiment of the present invention.

The frequency offset between different systems is of little importance. However, since a value obtained by multiplying TOF by the speed of light ($3 \times 10^8$(m/s)) is a distance in the ranging and the position estimate using TOF, a large distance error may occur due to the frequency tolerance. Therefore, it is possible to reduce distance and position estimate errors by estimating the frequency offset between the systems.

Assuming that the first anchor node $N_A$ (111) uses a clock frequency "$f_A$", the second anchor node $N_B$ (112) uses a clock frequency "$f_B$", "$f_R$" is a network synchronization frequency (i.e., a reference clock frequency), which is a standard for providing exact timing, and "$f_A$" and "$f_B$" are within an allowable error range from the reference clock frequency $f_R$, the clock frequencies $f_A$ and $f_B$ can be expressed by Equation 1 given below.

$$f_A = f_R(1+e_A),$$

$$f_B = f_R(1+e_B) \quad \text{(Equation 1)}$$

(where $e_A$ indicates the frequency offset (ppm) of the first anchor node $N_A$ (111), and $e_B$ indicates the frequency offset (ppm) of the second anchor node $N_B$ (112)).

In addition, a time interval can be represented by the difference between the products of one clock period and clock counter values. Since the time interval between the operations of a transmitter transmitting frames is equal to that between the operations of a receiver receiving the frames in Steps S401 and S403, the same time interval can be expressed by Equation 2 given below.

$$T_{AT2} - T_{AT1} = T_{BR2} - T_{BR1},$$

$$T_{AT2} - T_{AT1} = (n_{AT2} - n_{AT1})/f_A,$$

$$T_{BR2} - T_{BR1} = (n_{BR2} - n_{BR1})/f_B. \quad \text{(Equation 2)}$$

When Equation 1 is substituted into Equation 2, Equation 3 given below is obtained, which includes information acquired from the first anchor node $N_A$ (111) and the second anchor node $N_B$ (112) and two unknown quantities.

$$(n_{AT2} - n_{AT1})/(1+e_A) = (n_{BR2} - n_{BR1})/(1+e_B). \quad \text{(Equation 3)}$$

In step S404, the second anchor node $N_B$ (112) transmits the time information, which has been generated in steps S401, S402, and S403 in order to estimate TOF, to the first anchor node $N_A$ (111). Therefore, $$\text{TOF}(\hat{t}_p)$$

between the first anchor node $N_A$ (111) and the second anchor node $N_B$ (112) in consideration of the frequency difference can be expressed by Equation 4 given below.

$$4\hat{t}_p = (T_{BR1} - T_{AT1}) + 2(T_{AR1} - T_{BT1}) + (T_{BR2} - T_{AT2}) \quad \text{(Equation 4)}$$
$$= (T_{AR1} - T_{AT1}) - (T_{AT2} - T_{AR1}) + (T_{BR2} - T_{BT1}) -$$
$$(T_{BT1} - T_{BR1})$$
$$= [\{(n_{AR1} - n_{AT1}) - (n_{AT2} - n_{AR1})\}/f_R(1+e_A)] +$$
$$[\{(n_{BR2} - n_{BT1}) - (n_{BT1} - n_{BR1})\}/f_R(1+e_B)].$$

Since the anchor nodes including the first anchor node $N_A$ (111) and the second anchor node $N_B$ (112) are preinstalled, the distance between the nodes is known. As shown in FIG. 1, when the distance is referred to as $d_{AB}$, $$\text{TOF}(\hat{t}_p)$$

can be expressed by Equation 5 given below.

$$\hat{t}_p = d_{AB}/C \quad \text{(Equation 5)}$$

(where, 'c' is $10^8$(m/s)).

From Equations 3, 4, and 5, c is a constant, "$d_{AB}$" is a known value, and the time information is acquired from the first anchor node $N_A$ (111) and the second anchor node $N_B$ (112).

Therefore, two numerical expressions are defined for frequency offsets $e_A$ and $e_B$, and the frequency offsets $e_A$ and $e_B$ of the first anchor node $N_A$ (111) and the second anchor node $N_B$ (112) from the reference frequency can be calculated.

The same method as described that is used for the frequency offset $e_A$ of the first anchor node $N_A$ (111) can be applied to calculate frequency offsets $e_A$, $e_B$, $e_C$, and e, of the anchor nodes 111 to 114 using a pair of the first anchor node $N_A$ (111) and the third anchor node $N_C$ (113) and a pair of the first anchor node $N_A$ (111) and the fourth anchor node $N_D$ (114).

As in Equation 4, a method of applying the difference between the counter values generated by the local clocks to the frequency offset to obtain the same result as that using the reference frequency may be similarly applied to a TWR method.

For example, in a low rate wireless personal area network (WPAN) standard, IEEE802.15.4a including a ranging function, a sampling frequency is 64 GHz, frame transmission and reception times are represented by a 32-bit clock, and the transmission and reception times of a ranging bit of the frame are used as standards for the representation of the transmission and reception times of the frame. Therefore, it is possible to accurately represent the transmission and reception times of the frame.

Figure 5:
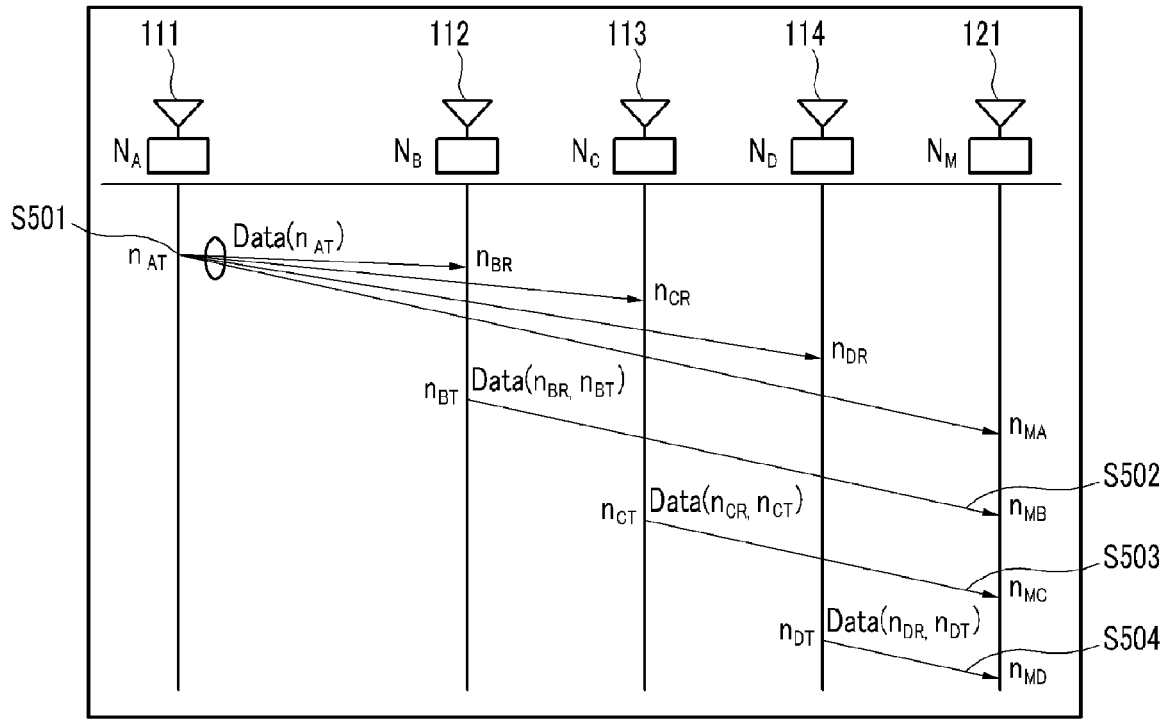
FIG. 5 is a flowchart illustrating a process of transmitting time information in the wireless sensor network according to the second exemplary embodiment of the present invention.

FIG. 5 is a flowchart illustrating a process of transmitting time information in a wireless sensor network according to the second exemplary embodiment of the present invention. Specifically, FIG. 5 is a flowchart illustrating a process of transmitting the ranging frame including the time information of the anchor node to the mobile node to estimate the position of the mobile node.

Referring to FIG. 5, a description will be made of an algorithm in which the anchor nodes $N_A$ (111), $N_B$ (112), $N_C$ (113), and $N_D$ (114) transmit ranging frames including time information and the mobile node $N_M$ (121) estimates its position under the control of the location server 101 in the wireless sensor network according to this exemplary embodiment of the present invention.

First, in step S501 of FIG. 5, the first anchor node $N_A$ (111) transmits a first ranging frame, and the second anchor node $N_B$ (112), the third anchor node $N_C$ (113), the fourth anchor node $N_D$ (114), and the mobile node $N_M$ (121) receive all the ranging frames.

As shown in step S501 of FIG. 5, the first anchor node $N_A$ (111) transmits the first ranging frame with Data($n_{AT}$) at the time when a counter value is "$n_{AT}$", and the nodes 112, 113, 114, and 121 receive the ranging frame at the time when counter values are "$n_{BR}$", "$n_{CR}$", "$n_{DR}$", and "$n_{MA}$" respectively. For better understanding of the present invention, it is assumed that the first ranging frame with Data($n_{AT}$) includes information of the first counter value $n_{AT}$. The final equation for TDOA does not need the information of the first counter value $n_{AT}$. Therefore, the information does not need to be included in the first ranging frame. The mobile node $N_M$ (121) receives the ranging frame and obtains time values $n_{AT}$ and $n_{MA}$.

Then, in steps S502, S503, and S504 of FIG. 5, the anchor nodes 112, 113, and 114 transmit ranging frames with Data ($n_{BR}$, $n_{BT}$), Data($n_{BR}$, $n_{CT}$), and Data($n_{DR}$, $n_{DT}$) respectively, and the mobile node $N_M$ (121) receives the ranging frames and obtains ($n_{BR}$, $n_{CR}$, $n_{DR}$) and ($n_{BT}$, $n_{CT}$, $n_{DT}$) and ($n_{MB}$, $n_{MC}$, and $n_{MD}$).

As shown in step S502 of FIG. 5, in the relationship between the counter values of the second anchor node $N_B$ (112) and the mobile node $N_M$ (121), it is assumed that the second ranging frame with Data($n_{BR}$, $n_{BT}$) includes the counter value $n_{BR}$ of the second anchor node $N_B$ (112) at the time when the second anchor node $N_B$ (112) receives the signal transmitted from the first anchor node $N_A$ (111) and the counter value $n_{BT}$ of the second anchor node $N_B$ (112) at the time when the second anchor node $N_B$ (112) transmits the ranging frame with Data($n_{BR}$, $n_{BT}$).

As shown in step S503 of FIG. 5, in the relationship between the counter values of the third anchor node $N_C$ (113) and the mobile node $N_M$ (121), it is assumed that the third ranging frame with Data ($n_{BR}$, $n_{CT}$) includes the counter value $n_{CR}$ of the third anchor node $N_C$ (113) at the time when the third anchor node $N_C$ (113) receives the signal transmitted from the first anchor node $N_A$ (111) and the counter value $n_{CT}$ of the third anchor node $N_C$ (113) at the time when the third anchor node $N_C$ (113) transmits the third ranging frame with Data($n_{CR}$, $n_{CT}$).

As shown in step S504 of FIG. 5, in the relationship between the counter values of the fourth anchor node $N_D$ (114) and the mobile node $N_M$ (121), it is assumed that the fourth ranging frame with Data($n_{DR}$, $n_{DT}$) includes the counter value $n_{DR}$ of the fourth anchor node $N_D$ (114) at the time when the fourth anchor node $N_D$ (114) receives the signal transmitted from the first anchor node $N_A$ (111) and the counter value $n_{DT}$ of the fourth anchor node $N_D$ (114) at the time when the fourth anchor node $N_D$ (114) transmits the fourth ranging frame with Data($n_{DR}$, $n_{DT}$).

Then, as shown in FIG. 5, when the mobile node $N_M$ (121) collects information from the ranging frames, it is possible to calculate the difference in distance between the anchor nodes 111 to 114 and the mobile node 121 from the collected information.

First, time synchronization between the mobile node 121 and the anchor nodes 112 to 114 receiving the frame from the first anchor node $N_A$ (111) is needed, which is a reference for the anchor nodes 111 to 114.

The counter values of the second anchor node $N_B$ (112), the third anchor node $N_C$ (113), and the fourth anchor node $N_D$ (114) at the time when receiving the first ranging frame with Data($n_{AT}$) of the first anchor node $N_A$ (111) have the following relationship on the basis of the counter value $n_{AT}$ at the time when the first anchor node $N_A$ (111) transmits the ranging frame.

The counter value $n_{BA}$ of the second anchor node $N_B$ (112) at the reception time is "$n_{AT}+[\{d_{AB}(m)/c(m/sec)\}*f_R]$".

The counter value $n_{CA}$ of the third anchor node $N_C$ (113) at the reception time is "$n_{AT}+[\{d_{AC}(m)/c(m/sec)\}*f_R]$".

The counter value $n_{DA}$ of the fourth anchor node $N_D$ (114) at the reception time is $n_{AT}+[\{d_{AD}(m)/c(m/sec)\}*f_R]$.

Briefly, this can be expressed by Equation 6 given below.

$$n_{BA} <=> \hat{n}_{BA} = n_{AT} + \{(d_{AB}/C)*f_R\}$$

$$n_{CA} <=> \hat{n}_{CA} = n_{AT} + \{(d_{AC}/C)*f_R\}$$

$$n_{DA} <=> \hat{n}_{DA} = n_{AT} + \{(d_{AD}/C)*f_R\} \quad \text{(Equation 6)}$$

Equivalent values to the counter values of the second anchor node $N_B$ (112), the third anchor node $N_C$ (113), and the fourth anchor node $N_D$ (114) at the time when transmitting the ranging frames on the basis of the counter value of the first anchor node $N_A$ (111) at the time when transmitting the ranging frame are expressed by Equation 7 given below.

$$n_{BT} <=> \hat{n}_{BT} = \hat{n}_{BA} + \{(n_{BT} - n_{BA})/(1+e_B)\}$$

$$n_{CT} <=> \hat{n}_{CT} = \hat{n}_{CA} + \{(n_{CT} - n_{CA})/(1+e_C)\}$$

$$n_{DT} <=> \hat{n}_{DT} = \hat{n}_{DA} + \{(\hat{n}_{DT} - n_{DA})/(1+e_D)\} \quad \text{(Equation 7)}$$

Equivalent values to the counter values of the second anchor node $N_B$ (112), the third anchor node $N_C$ (113), and the fourth anchor node $N_D$ (114) at the time when receiving signals on the basis of the counter value of the mobile node $N_M$ (121) at the time when receiving the signal transmitted from the first anchor node $N_A$ (111) are expressed by Equation 8 given below.

$$n_{MA} <=> \hat{n}_{MA} = n_{AT} + \{(D_A/c)*f_R\}$$

$$n_{MB} <=> \hat{n}_{MB} = \hat{n}_{BT} + \{(D_B/c)*f_R\}$$

$$n_{MC} <=> \hat{n}_{MC} = \hat{n}_{CT} + \{(D_C/c)*f_R\}$$

$$n_{MD} <=>_{MD} = \hat{n}_{DT} + \{(D_D/c)*f_R\} \quad \text{(Equation 8)}$$

Equation 8 is rearranged to Equation 9 for the distances between the anchor nodes 111 to 114 and the mobile node 121.

$$D_A = (\hat{n}_{MA} - n_{AT}) * (c/f_R)$$

$$D_B = (\hat{n}_{MB} - \hat{n}_{BT}) * (c/f_R)$$

$$D_C = (\hat{n}_{MC} - \hat{n}_{CT}) * (c/f_R)$$

$$D_D = (\hat{n}_{MD} - \hat{n}_{DT}) * (c/f_R) \quad \text{(Equation 9)}$$

The difference in distance ($D_{BA}=D_B-D_A$) between the second and first anchor nodes $N_B$ (112) and $N_A$ (111), the difference in distance ($D_{CA}=D_C-D_A$) between the third and first anchor nodes $N_C$ (113) and $N_A$ (111), and the difference in distance ($D_{DA}=D_D-D_A$) between the fourth and first anchor nodes $N_D$ (114) and $N_A$ (111) calculated by the mobile node $N_M$ (121) using Equation 9 are expressed by Equation 10 given below. In Equation 10, a difference in counter value for one node is converted into a counter value for the reference frequency by applying the frequency offset.

$$\begin{aligned}
D_{BA} = D_B - D_A &= \{(\hat{n}_{MB} - \hat{n}_{BT}) - (\hat{n}_{MA} - n_{AT})\} * (c/f_R) \quad \text{(Equation 10)}\\
&= \{(n_{MB} - n_{MA})/(1+e_M) - \hat{n}_{BA} - (n_{BT} - n_{BA})/\\
&\quad (1+e_B) + n_{AT}\} * (c/f_R)\\
&= [(n_{MB} - n_{MA})/(1+e_M) - \{n_{AT} + (d_{AB} * f_R)/c\} -\\
&\quad (n_{BT} - n_{BA})/(1+e_B) + n_{AT}] * (c/f_R)\\
&= [(n_{MB} - n_{MA})/(1+e_M) - (n_{BT} - n_{BA})/\\
&\quad (1+e_B) - (d_{AB} * f_R)/c] * (c/f_R)
\end{aligned}$$

$$\begin{aligned}
D_{CA} = D_C - D_A &= \{(\hat{n}_{MC} - \hat{n}_{CT}) - (\hat{n}_{MA} - n_{AT})\} * (c/f_R)\\
&= [(n_{MC} - n_{MA})/(1+e_M) - (n_{CT} - n_{CA})/(1+e_C) -\\
&\quad (d_{AC} * f_R)/c] * (c/f_R)
\end{aligned}$$

$$\begin{aligned}
D_{DA} = D_D - D_A &= \{(\hat{n}_{MD} - \hat{n}_{DT}) - (\hat{n}_{MA} - n_{AT})\} * (c/f_R)\\
&= [(n_{MD} - n_{MA})/(1+e_M) - (n_{DT} - n_{DA})/(1+e_D) -\\
&\quad (d_{AD} * f_R)/c] * (c/f_R)
\end{aligned}$$

The mobile node $N_M$ (121) can estimate its position by applying Equation 10 to TDOA. If it is difficult for the mobile node $N_M$ (121) to estimate its position, the mobile node may transmit the collected information to the location server 101 to request to estimate its position.

As shown in FIG. 5, "$n_{BT}$", "$n_{CT}$", and "$n_{DT}$" are time information items acquired after the ranging frames are transmitted. Therefore, when a process of transmitting these information items is added, it is possible to calculate the current position of the mobile node $N_M$ (121).

As another method, when there is little movement of the mobile node $N_M$ (121), the previous time information items $n_{BT}$, $n_{CT}$, and $n_{DT}$, not the current time information items, may be used. In this case, all information used in the equations need to be related to the previous process. Therefore, the position of the mobile node $N_M$ (121) estimated on the basis of the current time information is the position of the mobile node $N_M$ (121) at the time when the previous process is performed.

Figure 6:
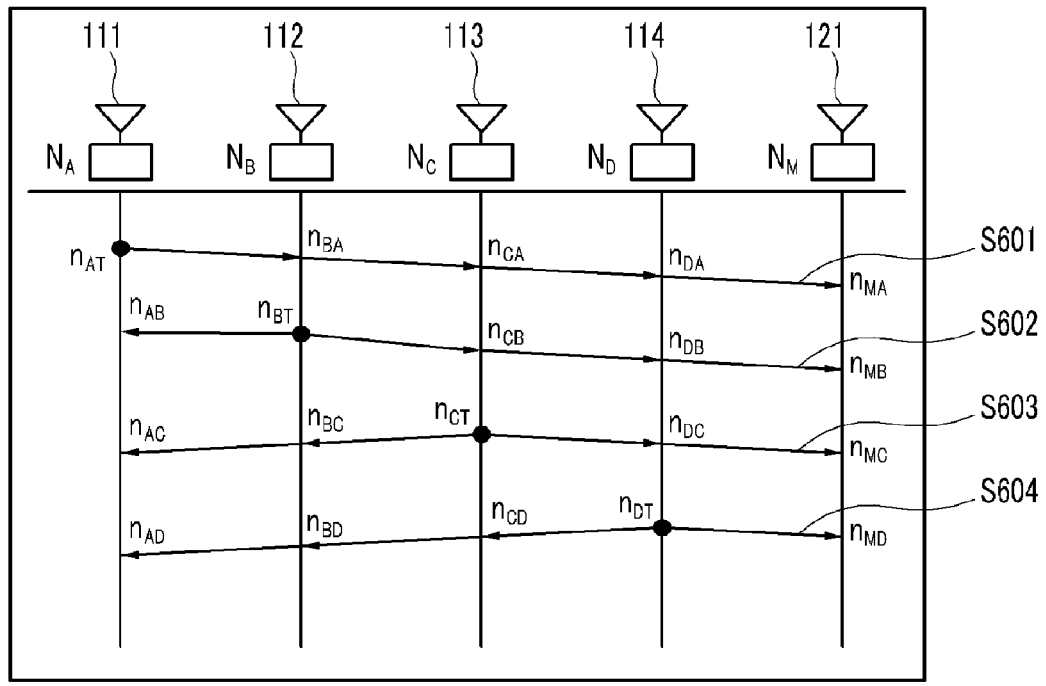
FIG. 6 is a flowchart illustrating a process of transmitting time information in the wireless sensor network according to a third exemplary embodiment of the present invention.

FIG. 6 is a flowchart illustrating a process of transmitting time information in a wireless sensor network according to a third embodiment of the present invention. Specifically, FIG. 6 is a flowchart illustrating a process of transmitting the ranging frame broadcasted from an anchor node to all of the other anchor nodes and a mobile node.

As shown in FIG. 6, each of the anchor nodes 111 to 114 according to this exemplary embodiment of the present invention transmits a ranging frame, and the other anchor nodes 111 to 114 transmit ranging frames including the reception times of the previous frames to the mobile node 121.

As in Equation 10, which is the final result of FIG. 5, the transmission time of the ranging frame from the first anchor node $N_A$ (111), which is a reference anchor node, is not used.

These characteristics make it possible to sequentially process the transmission of the frames from the anchor nodes 111 to 114, when the anchor nodes 111 to 114 transmit the ranging frames including the reception time of a series of anchor node frames that are previously transmitted, as shown in FIG. 6.

That is, in steps S601, S602, S603, and S604, informations on the reception times of ranging frames from the previous anchor nodes 111 to 114 and information on the previous transmission time of the ranging frame are included in the ranging frame. Therefore, it is possible to separately insert the most current time information of each of the anchor nodes 111 to 114 in each process. Therefore, it is possible to estimate the position of the mobile node 121 in each process by processing the information included in the ranging frame in each process.

For example, when the ranging frames are transmitted in the order of the first anchor node $N_A$ (111), the second anchor node $N_B$ (112), the third anchor node $N_C$ (113), and the fourth anchor node $N_D$ (114), the mobile node $N_M$ (121) calculates the difference in distance ($D_{BA}=D_B-D_A$) between the second and first anchor nodes $N_B$ (112) and $N_A$ (111), the difference in distance ($D_{CA}=D_C-D_A$) between the third and first anchor nodes $N_C$ (113) and $N_A$ (111), and the difference in distance ($D_{DA}=D_D-D_A$) between the fourth and first anchor nodes $N_D$ (114) and $N_A$ (111). Then, the mobile node $N_M$ (121) applies the calculated distance differences $D_{BA}$, $D_{CA}$, and $D_{DA}$ to TDOA (time difference of arrival) to estimate the position of the mobile node $N_M$ (121) (S601).

Thereafter, when the first anchor node $N_A$ (111) transmits a ranging frame again, it is considered that the ranging frame is transmitted in the order of the second anchor node $N_B$ (112), the third anchor node $N_C$ (113), the fourth anchor node $N_D$ (114), and the first anchor node $N_A$ (111). Therefore, the mobile node $N_M$ (121) calculates the difference in distance ($D_{CB}=D_C-D_B$) between the third anchor node $N_C$ (113) and the second anchor node $N_B$ (112), the difference in distance ($D_{DB}=D_D-D_B$) between the fourth anchor node $N_D$ (114) and the second anchor node $N_B$ (112), and the difference in distance ($D_{AB}=D_A-D_B$) between the first anchor node $N_A$ (111) and the second anchor node $N_B$ (112). Then, the mobile node $N_M$ (121) applies the calculated distance differences $D_{CB}$, $D_{DB}$, and $D_{AB}$ to TDOA to estimate the position of the mobile node $N_M$ (121) (S602).

In this way, it is possible to sequentially update the position of the mobile node $N_M$ (121) using the sequential ranging frames from the anchor nodes 113 and 114 (S603 and S604).

Figure 7:
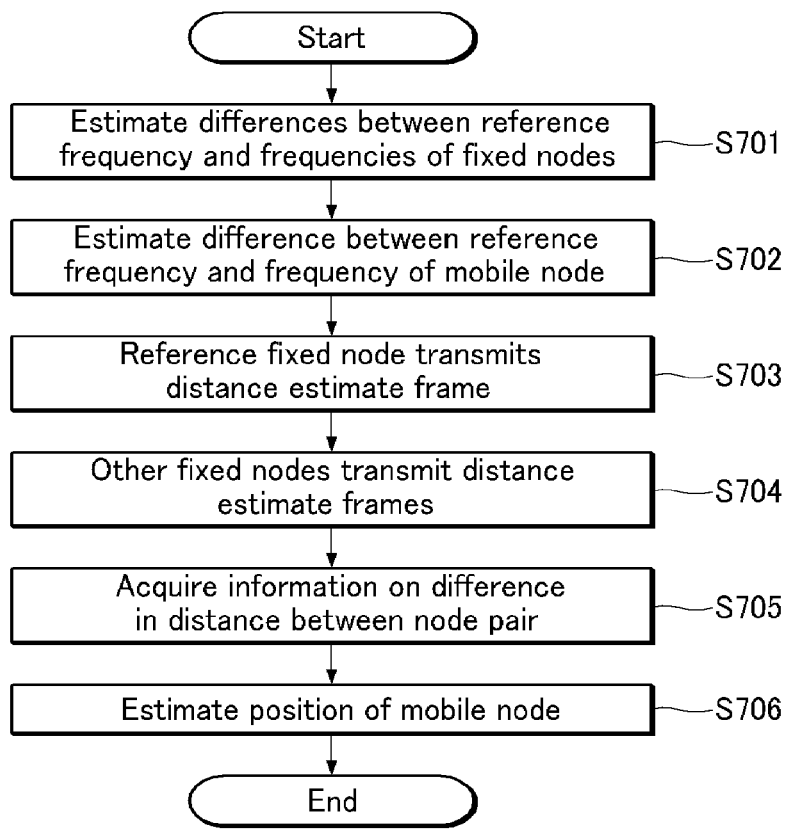
FIG. 7 is a flowchart illustrating a method of estimating the position of a mobile node in a wireless sensor network according to the third exemplary embodiment of the present invention.

FIG. 7 is a flowchart illustrating a method of estimating the position of a mobile node in a wireless sensor network according to the third exemplary embodiment of the present invention. Specifically, FIG. 7 is a flowchart illustrating a process of estimating the position of a mobile node using a method of estimating the difference between the arrival times of the ranging frames.

As shown in FIG. 7, the wireless sensor network according to this exemplary embodiment of the present invention estimates the position of the mobile node $N_M$ (121) using the estimate of a signal arrival time and the estimate of the difference between the arrival times of received signals.

In a wireless sensor network including a location server 101, a plurality of anchor nodes $N_A$ (111), $N_B$ (112), $N_C$ (113), and $N_D$ (114), and a mobile node $N_M$ (121), the location server 101 performs a process of estimating the differences between the first anchor node $N_A$ (111) and the second anchor node $N_B$ (112), between the first anchor node $N_A$ (111) and the third anchor node $N_C$ (113), and between the first anchor node N A (111) and the fourth anchor node $N_D$ (114) based on the reference frequency, as shown in FIG. 4. Then, the results are applied to Equations 3, 4, and 5 to estimate the frequency differences of the nodes 111 to 114, and the estimated results are stored in the location server 101 (S701).

Thereafter, when a new mobile node $N_M$ (121) is added to the ranging service, the location server 101 estimates the difference between the frequency of the first anchor node $N_A$ (111) and the frequency of the mobile node $N_M$ (121) based on the reference frequency, as shown in FIG. 4. Since the frequency difference of the first anchor node $N_A$ (111) has been calculated in step S701, the frequency difference is applied to Equation 3 to estimate the difference between the reference frequency and the frequency of the mobile node $N_M$ 121, and the result is stored in the location server 101 (S702).

Then, as shown in FIG. 5, under the control of the location server 101, the first anchor node $N_A$ (111), which is a reference node, transmits a ranging frame including information required for a distance estimate (S703).

Then, the other anchor nodes $N_B$ (112), $N_C$ (113), and $N_D$ (114) transmit ranging frames including information required for distance estimate (S704).

Then, the mobile node $N_M$ (121) acquires information on the difference in distance between a pair of nodes. That is, the mobile node $N_M$ (121) acquires information on the difference in distance to be applied to TDOA, from the information included in the ranging frames, which is required for the distance estimate, transmitted from the anchor nodes 111 to 114, and information on the time when the mobile node $N_M$ (121) receives the ranging frames (S705).

The mobile node $N_M$ (121) applies the information on the difference in distance between the pair of nodes, which is acquired in step S705, to TDOA to estimate its position (S706). If it is difficult for the mobile node $N_M$ (121) to estimate its position, the mobile node may transmit a frame including related information to the location server 101 to request to estimate its position.

In embodiment, the steps S703-S706 are performed whenever the position estimation is performed, but the steps S701 and S702 are performed less than the steps S703-S706.

Therefore, in the wireless sensor network according to this exemplary embodiment of the present invention, the location server 101 estimates the frequency offsets of the anchor nodes 111 to 114 by installing a small number of anchor nodes 111 to 114 at known positions. Further, since the distance between the nodes is known, it is possible to acquire the difference between the times when the mobile node 121 receive the signals transmitted from two of the anchor nodes 111 to 114, and it is possible to estimate the position of the mobile node 121 using TDOA on the basis of the acquired information.

As described above, in the method of estimating the position of a mobile node in the wireless sensor network according to the exemplary embodiment of the present invention, the anchor nodes sequentially transmit ranging frames once, and a plurality of mobile nodes receive the ranging frames to estimate their positions, unlike the related art that transmits ranging frames several times to estimate the time of flight (TOF) between a pair of nodes according to an asynchronous two-way ranging (TWR) method and a symmetric double sided (SDS)-TWR method. Therefore, a plurality of mobile nodes can estimate their positions with a minimum number of ranging frame transmissions, without using a separate network synchronization unit.

Further, the method of estimating the position of a mobile node in the wireless sensor network according to the exemplary embodiment of the present invention can easily construct a wireless sensor network for estimating position without using a separate network synchronization unit, such as a wire cable, or a very precise and expensive local oscillator. Therefore, the mobile node can estimate its position. As a result, it is possible to rapidly and accurately estimate distance using an OWR method, and more accurately estimate the position of a mobile node.

The method of estimating the position of a mobile node in a wireless sensor network using a passive mode OWR method has been described above in this exemplary embodiment of the present invention.

The above-described exemplary embodiments of the present invention can be applied to programs that allow computers to execute functions corresponding to the configurations of the exemplary embodiments of the invention or recording media including the programs as well as the method and apparatus. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of estimating the position of a mobile node in a wireless sensor network, the method comprising:
   estimating frequency offsets of anchor nodes and a mobile node, the frequency offsets representing differences between a reference frequency and frequencies of the anchor nodes and the mobile node;
   allowing the anchor nodes to sequentially transmit ranging frames;
   allowing the mobile node to receive the ranging frames and to estimate differences between the reception times of ranging frames from two anchor nodes; and
   applying the estimated difference between the reception times of the ranging frames to time difference of arrival (TDOA) to estimate the position of the mobile node.

2. A method of estimating the positions of a plurality of mobile nodes in a wireless sensor network including a small number of anchor nodes, the method comprising:
   estimating frequency offsets of the anchor nodes, the frequency offsets of the anchor nodes representing differences between a reference frequency and frequencies of the anchor nodes;
   when a new mobile node is connected, estimating a frequency offset of the mobile node, the frequency offset of the mobile node representing a difference between the reference frequency and a frequency of the mobile node;
   allowing the anchor nodes to sequentially transmit ranging frames;
   allowing the mobile node to receive the ranging frames, form node pairs, and estimate a difference in distance between the formed node pair; and
   applying the difference in distance between the node pair to time difference of arrival (TDOA) to estimate the position of the mobile node.

3. The method of claim 2,
wherein, in the estimating of the difference in distance between the node pair, the mobile node induces instantaneous synchronization between the node pair using the positions of the anchor nodes, the frequency offsets of the related nodes, and a measured counter value, and estimates the difference in distance between the node pair.

4. A method of estimating the position of a mobile node in a wireless sensor network including a plurality of anchor nodes, the method comprising:
using the anchor nodes to form pairs of anchor nodes connected to each other;
calculating frequency offsets of the anchor nodes on the basis of information on the transmission and reception times of ranging frames between the pair of anchor nodes;
calculating the frequency offset of the mobile node on the basis of information on the transmission and reception times of ranging frames between one of the anchor nodes whose frequency tolerance has been known and a new mobile node;
allowing the anchor nodes to sequentially transmit the ranging frames, starting from a reference anchor node, and allowing the other anchor nodes and the mobile node to receive the transmitted ranging frames;
allowing the mobile node to calculate a difference in distance between the anchor nodes and the mobile node at a synchronization time on the basis of information on the reception time of the ranging frame, time information included in the ranging frame, the positions of the anchor nodes, and the frequency offset of each node; and
applying the calculated difference in distance to time difference of arrival (TDOA) to estimate the position of the mobile node,
wherein, in the calculation of the frequency offsets of the anchor nodes, the frequency offsets of two nodes are calculated from the distance between the two nodes, an expression to calculate time of flight (TOF) between the two nodes, and an expression obtained from the relationship in which the transmission and reception times of the ranging frames, which are generated in parallel between the two nodes, are equal to each other.

5. The method of claim 4,
wherein, in the calculation of the frequency offset of the mobile node, when one anchor node whose frequency offset has been known is used to calculate the frequency offset of a new mobile node, the frequency offset of each of the two nodes is calculated from an expression obtained from the relationship in which the transmission and reception times of the ranging frames, which are generated in parallel between the two nodes, are equal to each other.

6. The method of claim 4,
wherein the receiving of the ranging frames by the other anchor nodes and the mobile node comprises:
allowing the reference anchor node to transmit the ranging frame and allowing the other anchor nodes receiving the ranging frame to insert time information related to the ranging frame into the ranging frame and transmit the ranging frame again; and
allowing the mobile node to acquire information on the reception time of the ranging frames from all the anchor nodes and the information included in the ranging frames.

7. The method of claim 6,
wherein the receiving of the ranging frames by the other anchor nodes and the mobile node further comprises inserting information on the latest time when the previous anchor node receives the ranging frame into the ranging frame transmitted from the anchor node.

8. The method of claim 7,
wherein the calculation of the difference in distance comprises estimating the position of the mobile node whenever the mobile node receives the ranging frame from one of the anchor nodes.

9. The method of claim 4,
wherein the calculation of the difference in distance comprises: using information on the time when the other anchor nodes and the mobile node receive the ranging frame transmitted from the reference anchor node as a standard for time synchronization; and
using the time when the other anchor nodes transmit the ranging frame and the time when the mobile node receives the ranging frame to estimate the distance between the reference anchor node and the mobile node and the difference in distance between the other anchor nodes and the mobile node.

10. A method of estimating the position of a mobile node in a wireless sensor network having a location server, a plurality of anchor nodes, and the mobile node, the method comprising:
estimating differences between a reference frequency and frequencies of the anchor nodes under the control of the location server and storing the estimated result in the location server;
when a new mobile node is added to a distance estimate service, estimating differences between the reference frequency and frequencies of a reference anchor node and the mobile node under the control of the location server, and storing the estimated result in the location server;
allowing the location server to control the reference anchor node and the other anchor nodes to transmit frames including information required for distance estimate;
allowing the mobile node to acquire distance difference information to be applied to time difference of arrival (TDOA) from the information required for distance estimate, which is included in the transmitted frame and information on the reception time of the frame; and
transmitting the frame including the acquired distance difference information to the location server to request to estimate the position of the mobile node.

11. The method of claim 10,
wherein the allowing the location server to control the reference anchor node and the other anchor nodes to transmit frames including information required for distance estimate comprises: allowing the reference anchor node to transmit the ranging frame and allowing the other anchor nodes receiving the ranging frame to insert time information related to the ranging frame into the ranging frame and to transmit the ranging frame again.

12. The method of claim 11,
wherein the allowing the location server to control the reference anchor node and the other anchor nodes to transmit frames including information required for distance estimate further comprises inserting information on the latest time when the previous anchor node receives the ranging frame into the ranging frame transmitted from the anchor node.

* * * * *